C. B. CULBERTSON.
REVERSIBLE PLOW.
APPLICATION FILED JULY 17, 1919.
1,367,127.
Patented Feb. 1, 1921.
3 SHEETS—SHEET 1.
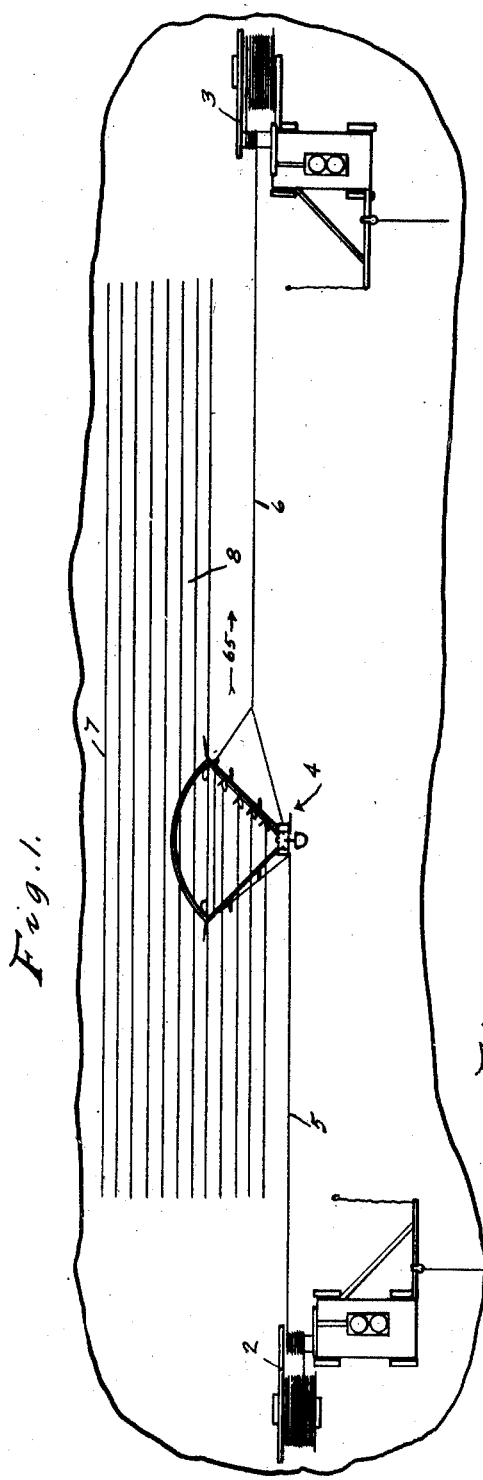
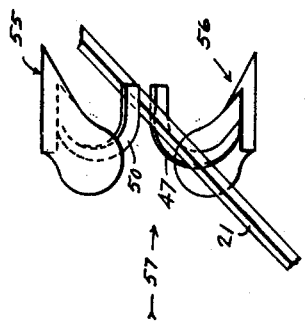
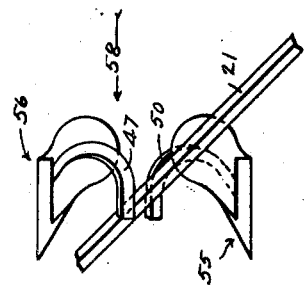
INVENTOR.
C. B. Culbertson,
BY
ATTORNEYS.

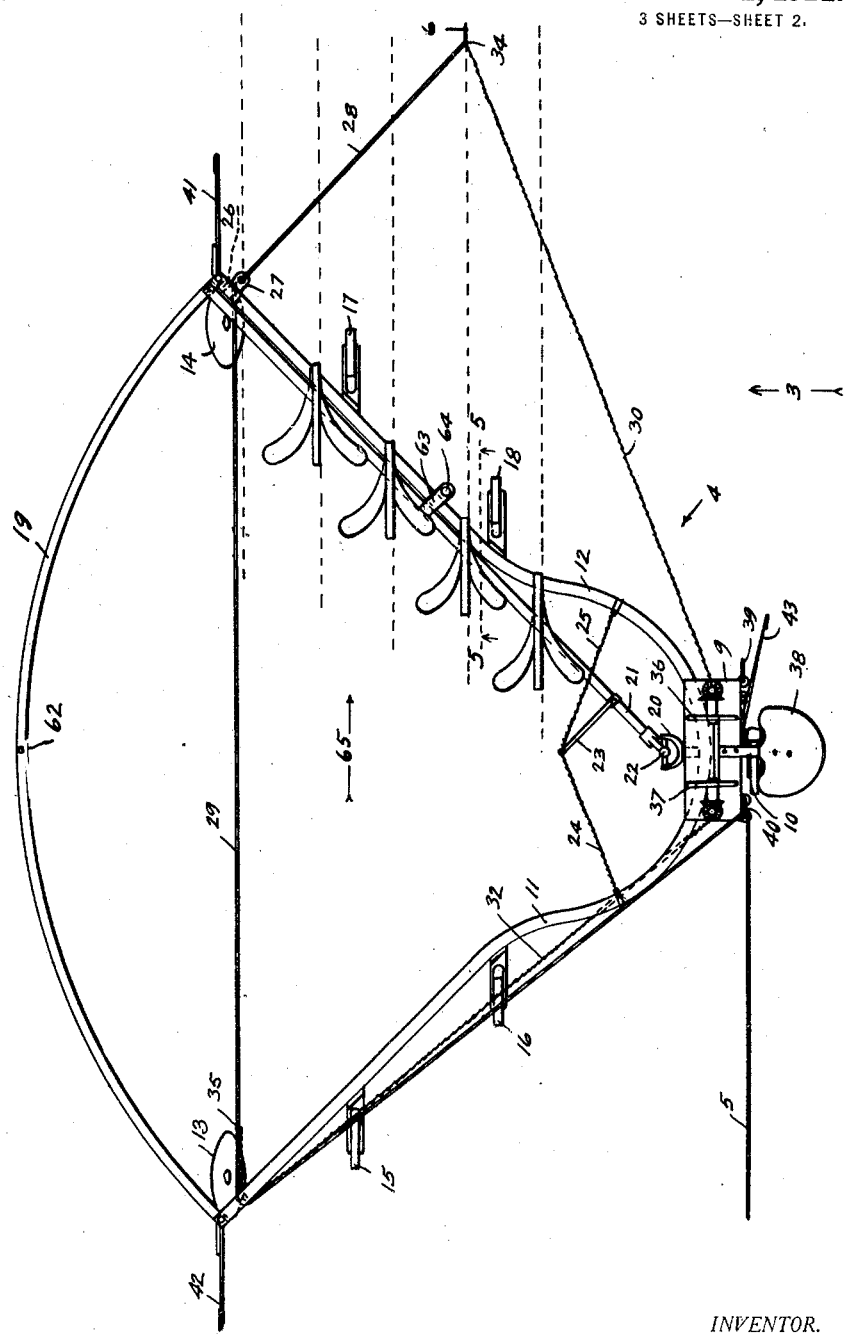

C. B. CULBERTSON.
REVERSIBLE PLOW.
APPLICATION FILED JULY 17, 1919.
1,367,127.
Patented Feb. 1, 1921.
3 SHEETS—SHEET 3.
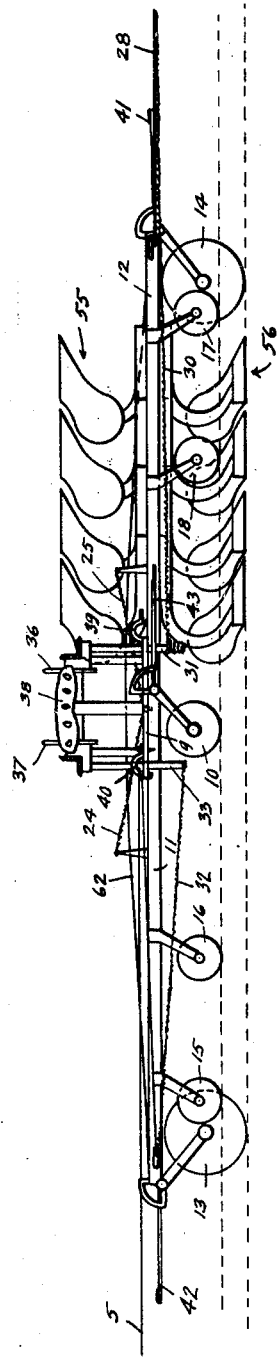
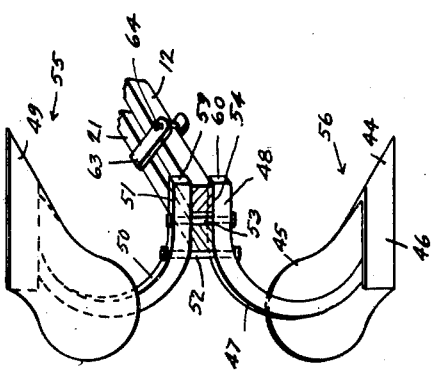
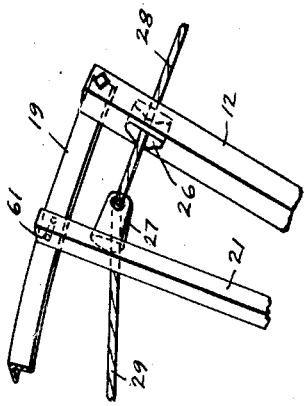
INVENTOR.
C. B. Culbertson
BY
ATTORNEYS.

UNITED STATES PATENT OFFICE.

CHARLES B. CULBERTSON, OF PASADENA, CALIFORNIA.

REVERSIBLE PLOW.

1,367,127.  Specification of Letters Patent.  Patented Feb. 1, 1921.

Application filed July 17, 1919. Serial No. 311,602.

*To all whom it may concern:*

Be it known that I, CHARLES B. CULBERTSON, a citizen of the United States, residing at Pasadena, in the county of Los Angeles and State of California, have invented new and useful Improvements in Reversible Plows, of which the following is a specification.

My object is to make a reversible plow, and my invention consists of the novel features herein shown, described and claimed.

One of the principal objects of my invention is to pull a gang plow back and forth across a field with a stationary engine or other power at each side of the field.

A further object of my invention is to provide a plow and plow operating construction that will greatly simplify and facilitate the work incident to the plowing of relatively large tracts of land.

Figure 1 is a diagrammatic plan view illustrating the use and operation of a reversible plow embodying the principles of my invention.

Fig. 2 is an enlarged top plan view of the reversible plow, the view being taken looking in the direction indicated by the arrow 2 in Fig. 3.

Fig. 3 is a side elevation looking in the direction indicated by the arrow 3 in Fig. 2.

Fig. 4 is an enlarged fragmentary perspective detail at the outer end of the rigid frame and at the outer and free end of the reversing frame and showing the attachment of one of the draft cables.

Fig. 5 is an enlarged cross sectional detail on the line 5—5 of Fig. 2.

Fig. 6 is a fragmentary perspective of one pair of reversible plowshares and showing the plows going to the right.

Fig. 7 is a view analogous to Fig. 6 and showing the parts reversed and going to the left.

Referring to Fig. 1, the field 1 may be of considerable size, for instance a quarter of a mile, or half a mile, or a mile long, and the power 2 is placed at one end of the field and the power 3 at the other end of the field.

The reversible plow 4 is connected to the power 2 by a cable 5 and to the power 3 by a cable 6 and operations may be started at the side 7 of the field, and the powers are operated first to pull the plow one way and then to pull the plow the other way as required to make the plowed ground 8.

The powers 2 and 3 may be internal combustion engines, electric motors, or any other suitable powers which will wind and unwind the cables 5 and 6 and which will wind the cables with sufficient force to pull the plow and which will take care of the wound cables. The details of the powers are not a part of my present invention, it only being necessary that suitable devices shall be provided for doing the work.

Referring to Figs. 2 and 3, the operating platform 9 is mounted upon an adjustable wheel 10, and the rigid frame bars 11 and 12 extend from the platform substantially at right angles to each other. The outer ends of the frame bars 11 and 12 are supported by adjustable wheels 13 and 14. Intermediate wheels 15 and 16 are connected to the intermediate portions of the bar 11, and intermediate wheels 17 and 18 are connected to the intermediate portions of the bar 12. The track bar 19 connects the outer ends of the bars 11 and 12 rigidly together. The swivel 20 projects toward the plowed ground from the platform 9, and the reversing bar 21 is connected to the swivel 20.

The bar 19 is concentric to the pivot 22 connecting the reversing bar 21 to the swivel 20, and the outer end of the reversing bar 21 rests upon the track bar 19. The reversing arm 23 extends from the reversing bar 21 at right angles and the outer end of the arm 23 is connected to the bars 11 and 12 by cables 24 and 25, said cables being substantially the same length so as to meet on a line half way between the bars 11 and 12.

Sockets openings 26 are formed at the outer ends of the bars 11 and 12, and a tongue 27 is formed at the outer end of the reversing bar 21 in position to pass through the sockets 26. The branch 28 of the cable 6 passes through the socket 26 of the bar 12 and is connected to the tongue 27, and the branch 29 of the cable 5 passes through the socket 26 of the bar 11 and is connected to the tongue 27. The branch 30 of the cable 6 is connected to and wound upon a windlass 31, and the branch 32 of the cable 5 is connected to and wound upon the windlass 33. The branches 28 and 30 are connected at the point 34, and the branches 29 and 32 are connected at the point 35. The windlasses 31 and 33 are operated by handwheels 36 and 37.

The operator's seat 38 is connected to the platform 9 convenient to the handwheels 36 and 37. Hooks 39 and 40 extend from the platform 9. Hand levers 41 and 42 are connected to the wheels 13 and 14 and have pawl and sector constructions for adjusting the wheels 13 and 14 to raise and lower the outer ends of the bars 11 and 12. A hand lever 43 controls the wheel 10 through a pawl and sector construction. The joint between the reversing bar 21 and the swivel 20 is a universal or tumbling rod construction so that the reversing bar 21 may swing from one operative position to another and turn half around.

Referring to Figs. 5, 6 and 7, the reversing bar 21 is rectangular in cross section. The plowshares 44 have mold boards 45, land sides 46 and beams 47. The beams 47 have straight horizontal portions 48 parallel with the lower sides of the plowshares and land sides, and the portions 48 fit against one side of the reversing bar 21. As shown there are four plowshares 44 in a gang.

In a like manner the plowshares 49 have mold boards, land sides and beams 50, and the beams 50 have straight portions 51 fitting against the opposite side of the reversing bar 21 from the portions 48.

Bolts 52 and 53 connect the portions 48 and 51 to clamp the beams rigid to the reversing bar 21. The bolts 53 are some distance from the ends of the portions 48 and 51 thereby leaving spaces 54 in which the bars 11 and 12 will fit. The beam portions 48 and 51 are set across the reversing bar 21 at right angles of approximately 45°, and the upper gang 55 of plowshares is turned in the opposite direction from the lower gang 56, so that the furrows will be turned in the same direction when the plow 4 is moving one way as when the plow is moving the other way.

In Fig. 6 the gang 56 is in plowing position and moving in the direction indicated by the arrow 57, and in Fig. 7 the gang 55 is in plowing position and moving in the direction indicated by the arrow 58.

In Fig. 5 the bar 12 is between the ends 59 and 60 of the portions 51 and 48 and holding the gang 56 in operative position and holding the reversing bar 21 from rotation. In a like manner the bar 11 holds the reversing bar 21 when the plow is going the other way.

A bolt hole 61 is formed in the outer end of the reversing bar 21, and a bolt hole 62 is formed at the center of the track bar 19, so that when the reversing bar 21 swings to the center of the track and turns half over a bolt may be inserted through the holes 61 and 62 to hold the gangs 55 and 56 with the plowshares pointing downwardly out of engagement with the ground, so that the plow may be readily moved from one field to another.

A U-clamp 63 is secured to the reversing bar 21 and straddles the bar 12 or the bar 11, and a bolt 64 is inserted through the ends of the clamp outside of the bar 12 or the bar 11 so as to hitch the reversing bar 21 to the bar 12 or the bar 11 as the case may be.

In the practical operation and referring especially to Figs. 1 and 2 and assuming that the plow 4 is going in the direction indicated by the arrow 65, the cable 5 is loosened and the cable 6 is being drawn by the power 3. The branches 28 and 30 of the cable 6 are drawn taut thereby pulling the outer end of the reversing bar 21 toward the outer end of the bar 12, and this operation rotates the reversing bar 21 through the cable 24 to bring the gang 56 into plowing position, and continued operation brings the outer end of the bar 21 against the outer end of the bar 12 with the ends 59 and 60 straddle of the bar 12, and continued operation will start to move the plow 4. The plow may be guided to a nicety by manipulating the handwheel 36 to lengthen or shorten the branch 30. The cable 5 is passed through the hook 40 and the power 2 is operated to allow the cable 5 to unwind freely until the plow 4 reaches the end of the field 1 in the vicinity of the power 3. Then the bar 2 may be moved laterally to the extent of another cut, the cable 5 unhooked from the hook 40, the cable 6 slacked, the cable 5 tightened, the bolt 64 removed and the power 2 operated to move the reversing bar 21 to the central position thereby bringing the gangs both out of engagement with the ground; then the plow 4 may be moved laterally on to the unplowed land the width of a cut of the plows, then the cable 5 operated to complete the reversing of the plowshares and bring the reversing bar 21 against the bar 11, the bolt 64 inserted, the cable 6 applied to the hook 39, and the power 2 operated to move the plow 4 to the opposite end of the field.

Obviously the power plants 2 and 3 may be moved laterally in any suitable manner and likewise may be anchored in operative positions by any suitable means.

By utilizing a reversible bar carrying two gangs of plows with one gang oppositely disposed with respect to the other, the time, labor and consequent expense ordinarily involved in plowing relatively large tracts of land is minimized.

It will be readily understood that minor changes in size, form and construction of the various parts of my improved reversible plow may be made and substituted for those herein shown and described, without departing from the spirit of my invention, the scope of which is set forth in the appended claims.

Various changes may be made without departing from the spirit of my invention as claimed.

I claim:

1. In a reversible plow, a substantially triangular frame, one of the sides of which is arcuate in form, and having its axis located adjacent to the meeting point between the other rails of the frame, a bar connected by a universal joint to said frame adjacent to the axis of the arcuate rail thereof, a gang of plows carried by and extending from one side of said rail, and a second gang of plows extending from the other side of said rail, the free end of said plow carrying bar having a bearing on the arcuate rail.

2. In a reversible gang plow in combination, a triangular frame one side of which is formed circular upon a center adjacent to one of the points of the triangular frame, a reversible bar pivotally mounted at the point of the frame and adapted to swing upon and be supported by the circular side of the frame, a gang of plows mounted upon one side of the bar, a second gang of plows mounted upon the other side of the bar pointed in the same direction as the first gang whereby the second gang will be adapted to plow in the opposite direction when the bar is reversed, means for reversing the bar, a rope connected with the frame for pulling the frame across a field in one direction, a second rope connected to the frame for pulling the frame across the field in the opposite direction, and means for guiding the gang of plows in its travel across the field.

3. In a reversible gang plow in combination, a triangular frame one side of which is formed circular upon a center adjacent to one of the points of the triangular frame, a reversible bar pivotally mounted at the point of the frame and adapted to swing upon and be supported by the circular side of the frame, a gang of plows mounted upon one side of the bar, a second gang of plows mounted upon the other side of the bar pointed in the same direction as the first gang whereby the second gang will be adapted to plow in the opposite direction when the bar is reversed, means for reversing the bar, a rope connected with the frame for pulling the frame across a field in one direction, a second rope for pulling the frame across a field in the opposite direction, means for guiding the gang of plows in its travel across the field comprising a line fixed to the pulling ropes adapted to snub the pulling ropes transversely of the line of travel, and means for manually operating the snubbing line.

In testimony whereof I have signed my name to this specification.

CHAS. B. CULBERTSON.